(12) United States Patent
Toshine et al.

(10) Patent No.: US 6,596,360 B2
(45) Date of Patent: Jul. 22, 2003

(54) MULTILAYER VOLUME HOLOGRAM, AND LABEL FOR MULTILAYER VOLUME HOLOGRAM FABRICATION

(75) Inventors: Tetsuya Toshine, Tokyo (JP); Hirotada Ohkawa, Tokyo (JP); Hiroyuki Ohtaki, Tokyo (JP); Kenji Ueda, Tokyo (JP); Fumiko Noujima, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 09/891,454

(22) Filed: Jun. 27, 2001

(65) Prior Publication Data

US 2002/0018253 A1 Feb. 14, 2002

(30) Foreign Application Priority Data

Jun. 27, 2000 (JP) .......................... 2000-193261
Jun. 29, 2000 (JP) .......................... 2000-195939

(51) Int. Cl.⁷ ............................. B42D 15/00
(52) U.S. Cl. .................. 428/40.1; 283/81; 283/86; 283/94; 283/108; 359/1; 359/2; 428/41.7; 428/41.8; 428/41.9; 428/42.2; 428/212; 428/214

(58) Field of Search .............. 428/40.1, 42.1, 428/41.8, 41.9, 41.7, 212, 214; 359/1, 2; 283/81, 86, 94, 108

(56) References Cited

U.S. PATENT DOCUMENTS 6,066,378 A * 5/2000 Morii .................. 428/40.2

* cited by examiner

Primary Examiner—Nasser Ahmad
(74) Attorney, Agent, or Firm—Sughrue Mion, PLLC

(57) ABSTRACT

In the multilayer volume hologram 1 of the invention, the adhesive layer 5, volume hologram 6 and surface protective film 7 are laminated on the application member 2 in this order, and the breaking strength of the hologram layer should be larger than the peel strength between the surface protective film and the volume hologram layer and smaller than the peel strength with which the hologram layer is peeled off the application member and the breaking strength of the surface protective film. This multilayer volume hologram provides a more improved protection for the volume hologram. A portrait replacement or falsification of an information area ensures that the volume hologram layer can break down. Thus, more reliable counterfeit-proofness is achievable.

9 Claims, 6 Drawing Sheets

MULTILAYER VOLUME HOLOGRAM, AND LABEL FOR MULTILAYER VOLUME HOLOGRAM FABRICATION

BACKGROUND OF THE INVENTION

The present invention relates generally to a multilayer volume hologram (volume hologram seal) structure comprising a transparent pictorial hologram, which is pasted on a surface of a photograph or personal information area attached to ID cards, exam cards, passports, etc. for the purpose of ensuring security and a label for making such a multilayer volume hologram, and more particularly to a multilayer volume hologram which cannot possibly be fraudulently altered or otherwise falsified, and a label for making such a multilayer volume hologram structure.

In recent years, means for preventing fraudulent alternation or falsification of identity cards, etc. have been proposed, for instance, so as to certainly identify who carries an ID card as who is characterized by identifying data born thereon. Such falsification preventive techniques, for instance, are disclosed in JU-B 05-48215 and JP-A's 05-201181 and 10-153944.

The techniques set forth in these publications make use of the fact that images carried on holograms have a function equivalent to that of inscriptions on conventional ID cards or the like. JP-A 05-201181 shows that when the protective film is stripped off for the purpose of falsification or the like, the surface relief hologram layer fractures so that it is impossible to reconstruct the hologram image, thereby preventing falsification as by making a photograph replacement. The surface relief hologram layer must be laminated in a cured or tackiness-free state so as to prevent the relief surface from being adversely affected.

On the other hand, a volume hologram comprises a photosensitive material wherein interference fringes are three-dimensionally recorded in its thickness direction. Recent developments of photosensitive resins and peripheral technologies make the mass fabrication of such volume hologram feasible. However, the volume holograms have tackiness and softness even when holograms are recorded, and so they are laminated on labels or the like while their tackiness is utilized. Thus, a grave problem with the volume holograms is that they are easy to falsify because protective filma are perfectly peeled off the volume holograms. To this end, techniques for preventing falsification by a volume hologram replacement have been proposed.

For instance, JP-A 10-153944 shows one counterfeit-proof technique using a volume hologram, wherein the peel strength between an application member and a hologram layer is larger than the breaking strength or tensile strength at 1% elongation of a hologram layer/surface protective layer multilayer structure, so that an attempt to peel the hologram layer off the application member causes a cohesive failure in the hologram layer or a discoloration of the hologram recorded therein, so that the hologram cannot be reused. However, since the volume hologram material is soft, the associated surface protective layer, too, must have the same physical properties. For instance, the surface protection of a volume hologram layer formed as a label or a multilayer hologram is still less than satisfactory.

JP-A 10-865665 shows a replacement-proof technique wherein in a multilayer structure comprising an application member/volume hologram layer/transparent protective sheet, adjacent layers are laminated together while an adhesive layer is interposed therebetween to provide an adhesion force distribution across it, so that an attempt to peel off the hologram layer results in a breakdown thereof. However, two adhesive agents must be used to provide such an adhesion force distribution. The operation involved does not only become complicated but also the use of different types of adhesive agents may be detected from the outside due to the refractive index difference.

JP-A 10-133552 shows that the adhesion between a protective film and a volume hologram layer is made weaker than the adhesion between an application member and the volume hologram layer, thereby generating a "release line" in a direction perpendicular to the direction along which the volume hologram layer is peeled off, so that counterfeit-proofness is achievable. However, the peel line generated varies with the pulling direction and force for peeling off the hologram layer. Accordingly, no definite release pattern is obtained and so whether or not the hologram layer is falsified is still indefinite.

An object of the present invention is to provide a multilayer volume hologram which provides an improved protection means for a volume hologram and ensures the destruction of the volume hologram upon forcibly peeled off, so that counterfeit-proofness is achievable, and a label for multilayer volume hologram fabrication which enables a multilayer volume hologram to be efficiently fabricated.

SUMMARY OF THE INVENTION

According to the first aspect of the present invention, there is provided a multilayer volume hologram laminated on an application member and comprising an adhesive layer, a volume hologram layer and a surface protective film in this order, wherein the breaking strength of said hologram layer is larger than the peel strength between said surface protective layer and said hologram layer and smaller than the peel strength which said hologram layer is peeled off said application member and the breaking strength of said surface protective film.

Said surface protective film is releasable from said volume hologram layer, and said volume hologram layer is unreleasable from said application member, so that upon a forcible peeling of said volume hologram layer, it breaks down due to a cohesive failure.

According to the second aspect of the present invention, there is provided a multilayer volume hologram laminated on an application member and comprising an adhesive layer, a volume hologram layer and a surface protective film easily bondable to said hologram layer, wherein the breaking strength of said hologram layer is smaller than the peel strength between said surface protective film and said hologram layer and the peel strength between said surface protective film and said hologram layer is smaller than the peel strength with which said hologram layer is peeled off said application member and the breaking strength of said surface protective film.

Said surface protective film is laminated on said volume hologram layer with an adhesive layer interleaved therebetween.

A layer or layers capable of making adhesion strength between said hologram layer and a layer with said hologram layer laminated thereon partially different is/are provided on one or both surfaces of said volume hologram layer in a patterned manner, so that when said hologram layer together with said surface protective film is peeled off, said hologram layer is broken into a portion of said hologram layer corresponding to said layer capable of making said adhesion strength partially different and other portion of said hologram layer in a patterned manner.

Said volume hologram together with said surface protective film is unreleasable from said application member, so that upon a forced peeling of said volume hologram, said volume hologram breaks down due to a cohesive failure.

According to the third aspect of the present invention, there is provided a multilayer volume hologram comprising an application member and, in order from said application member, an adhesive layer, a volume hologram layer, a surface protective coating film and a substrate releasable from said surface protective coating film, wherein the breaking strength of a multilayer structure from which said substrate is released and which comprises the hologram layer and the surface protective coating film is smaller than the peel strength with which the multilayer structure comprising said hologram layer and said surface protective coating film is peeled off said application member.

A layer or layers capable of making adhesion strength between said hologram layer and a layer with said hologram layer laminated thereon partially different is/are provided on one or both surfaces of said volume hologram layer in a patterned manner, so that when said hologram layer together with said surface protective film is peeled off, said hologram layer is broken into a portion of said hologram layer corresponding to said layer capable of making said adhesion strength partially different and other portion of said hologram layer in a patterned manner.

Said volume hologram together with said surface protective film is unreleasable from said application member, so that upon a forced peeling of said volume hologram, said volume hologram breaks down due to a cohesive failure.

Preferably, said layer capable of making said adhesion strength between both layers partially different comprises a release agent in an amount of 1 part by weight to 20 parts by weight per 100 parts by weight of an adhesive resin binder.

Preferably, said adhesive layer comprises an adhesive layer/colored layer/adhesive layer, and said colored layer is selected from a colored adhesive layer, a printed layer, a light reflective layer and a colored resin film.

Preferably, said volume hologram layer has a breaking strength of 0.01 kgf/mm² to 5 kgf/mm² and a breaking elongation of 0.01% to 50%.

According to the fourth aspect of the present invention, there is provided a label for fabrication of any one of the aforesaid multilayer volume holograms, wherein instead of said application member, a release sheet is laminated on said adhesive layer.

The multilayer volume hologram of the present invention provides an improved protection means for a volume hologram and ensures the destruction of the volume hologram upon forcibly peeled off, so that counterfeit-proofness is achievable, and the label for multilayer volume hologram fabrication of the present invention enables such multilayer volume holograms to be efficiently fabricated.

DESCRIPTION OF THE PREFERRED EMBODIMENTS

Figure 1A:
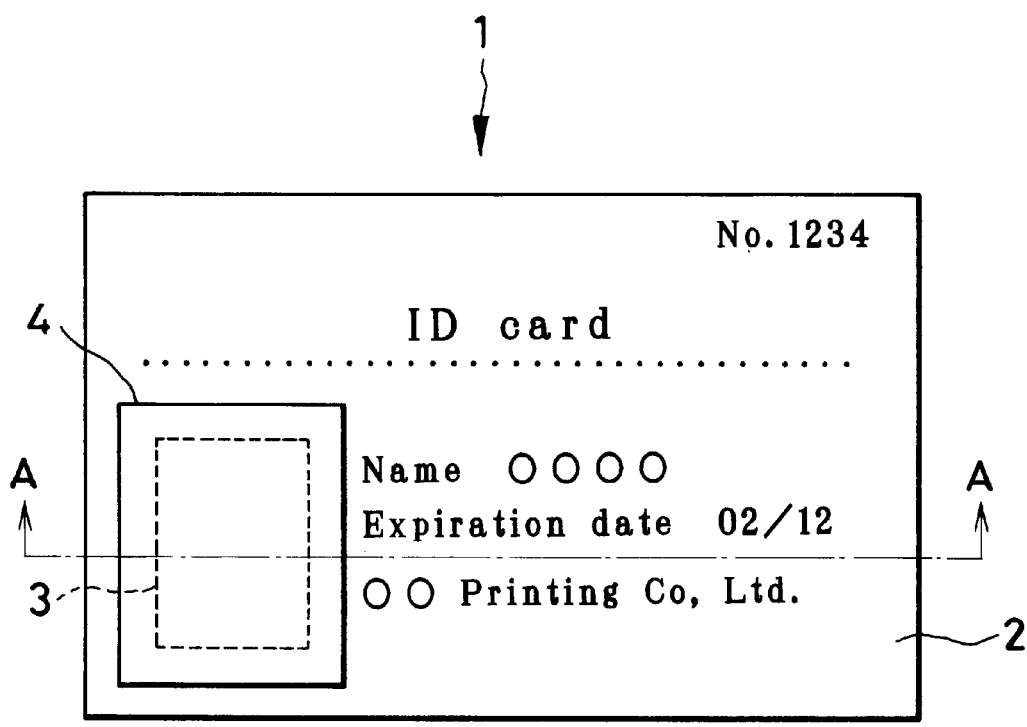
FIG. 1(a) is a front view of the multilayer volume hologram of the invention.
Figure 1B:
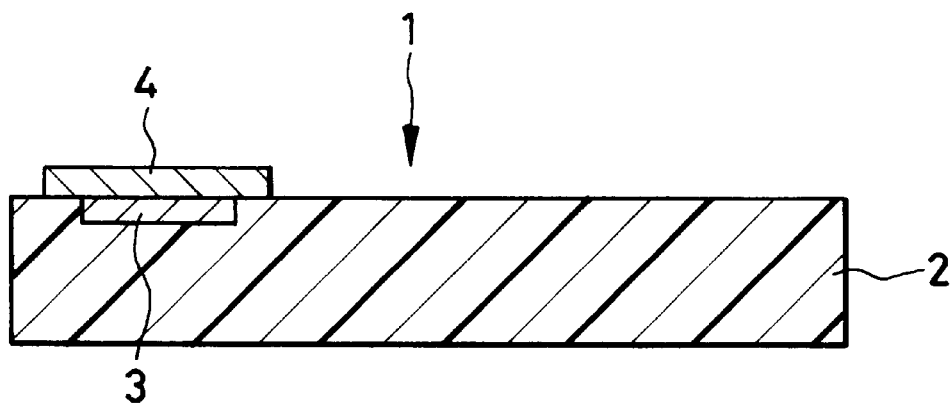
FIG. 1(b) is a sectional view taken on line A—A of FIG. 1(a).

FIG. 1(a) is a front view of the first to fourth multilayer volume holograms of the invention, and FIG. 1(b) is a sectional view taken on line A—A of FIG. 1(a).

Figure 2A:
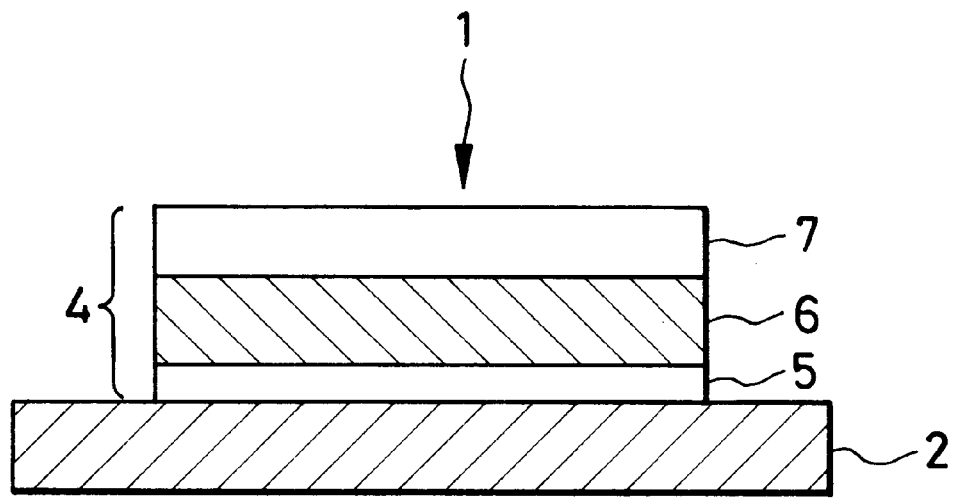
FIG. 2(a) a sectional view of the first multilayer volume hologram of the invention.
Figure 2B:
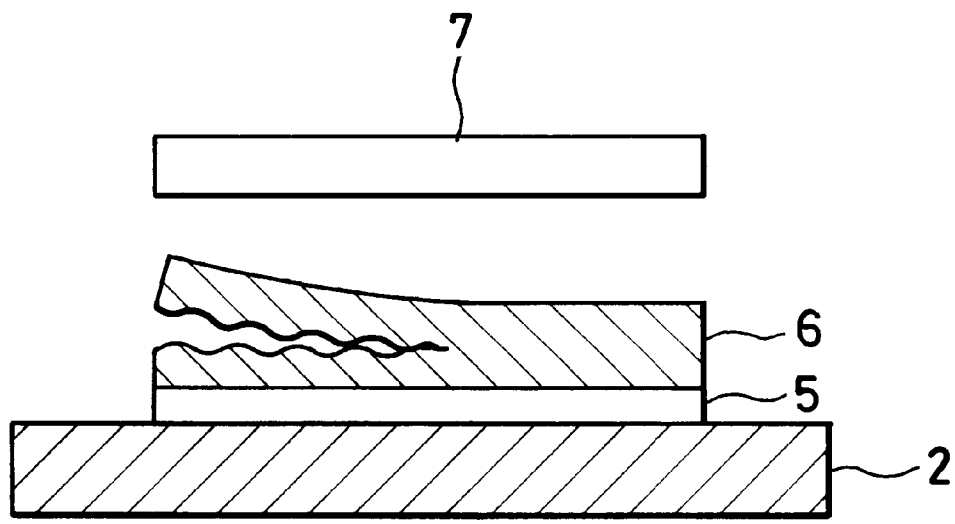
FIG. 2(b) is illustrative of what happens when the hologram layer is peeled off.

FIG. 2(a) a sectional view of a hologram seal portion of the first multilayer volume hologram of the invention, and FIG. 2(b) is illustrative of what happens when the hologram layer is peeled off.

Figure 3A:
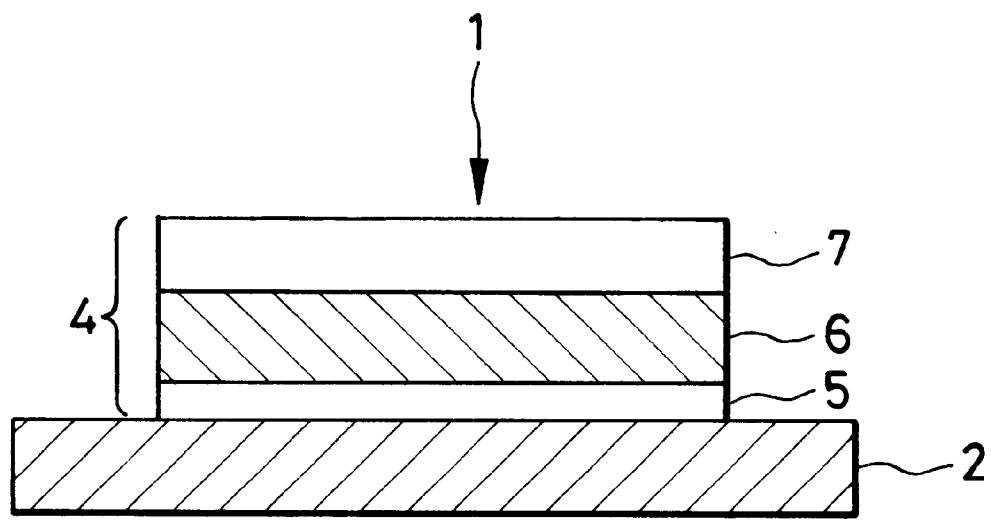
FIG. 3(a) a sectional view of the second multilayer volume hologram of the invention.
Figure 3B:
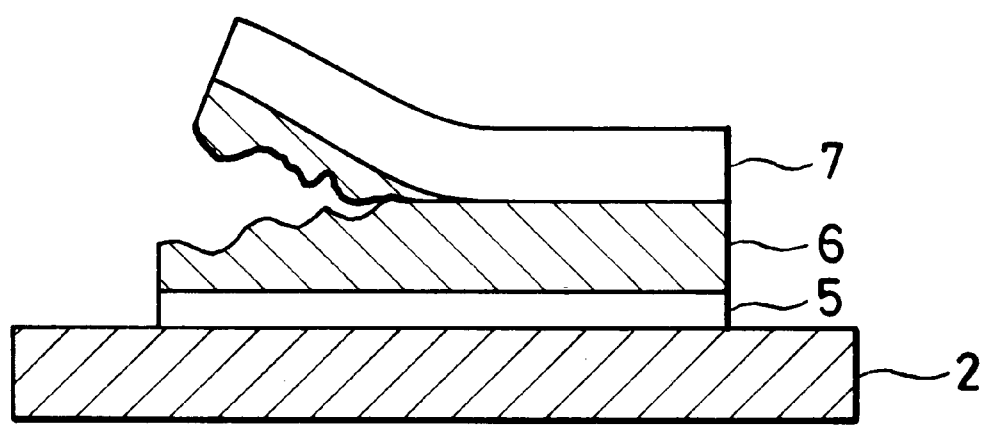
FIG. 3(b) is illustrative of what happens when the hologram layer is peeled off.

FIG. 3(a) a sectional view of a hologram seal portion of the second multilayer volume hologram of the invention, and FIG. 3(b) is illustrative of what happens when the hologram layer is peeled off.

Figure 4A:
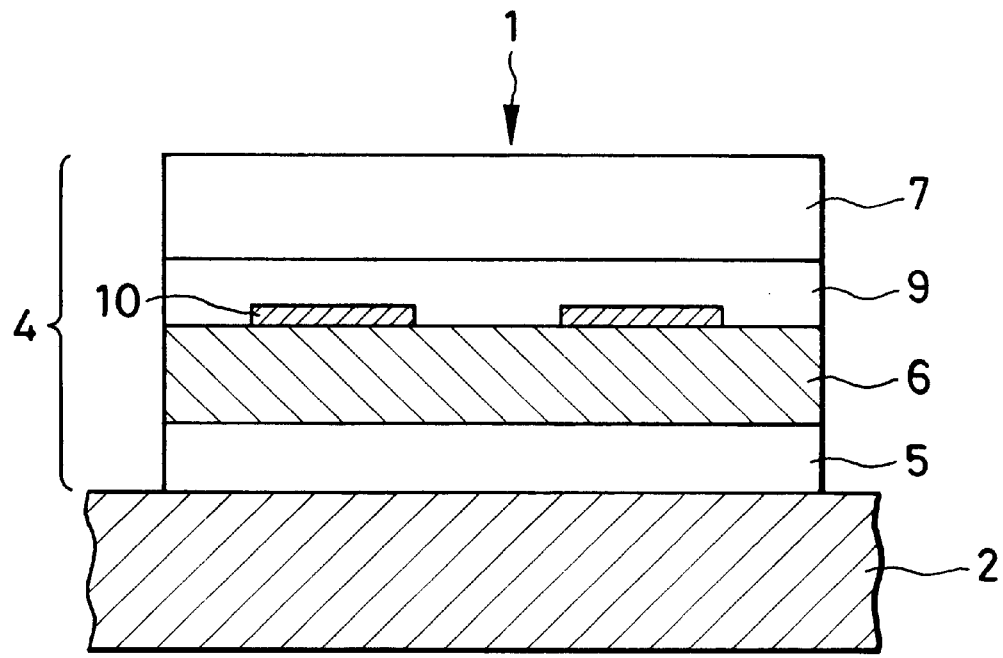
FIG. 4(a) a sectional view of another embodiment of the second multilayer volume hologram of the invention.
Figure 4B:
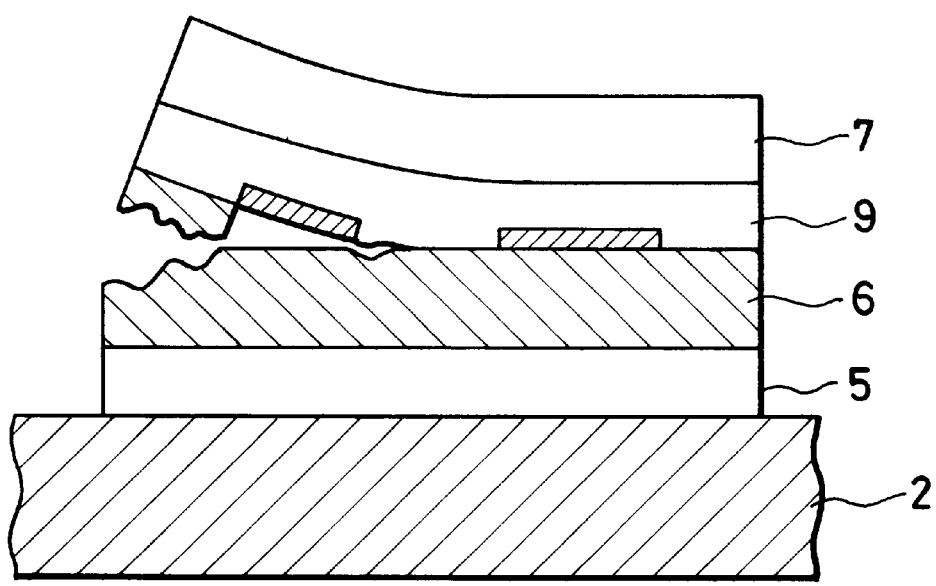
FIG. 4(b) is illustrative of what happens when the hologram layer is peeled off.

FIG. 4(a) is a sectional view of a hologram seal portion of the second multilayer volume hologram of the invention in the case where the layer 10 capable of making adhesion strength between both layers partially different is provided, and FIG. 4(b) is illustrative of what happens when the hologram layer is peeled off.

Figure 5A:
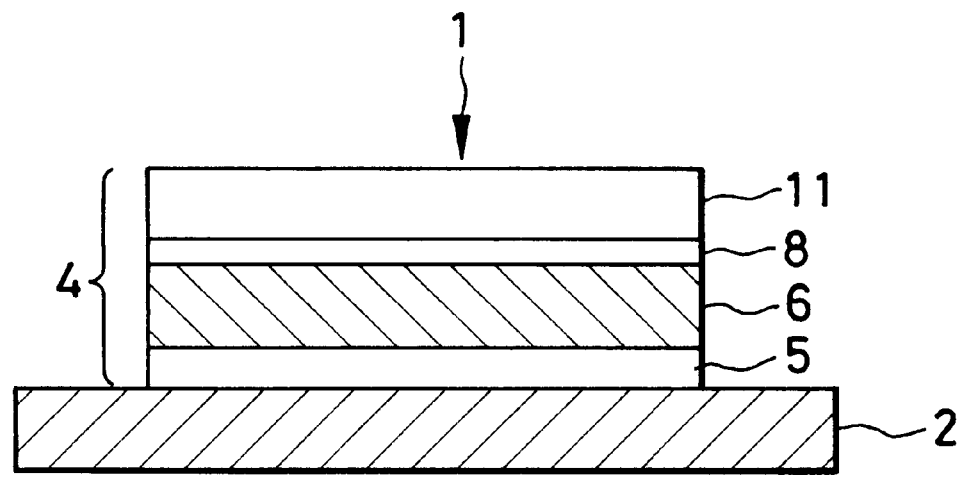
FIG. 5(a) a sectional view of the third multilayer volume hologram of the invention.
Figure 5B:
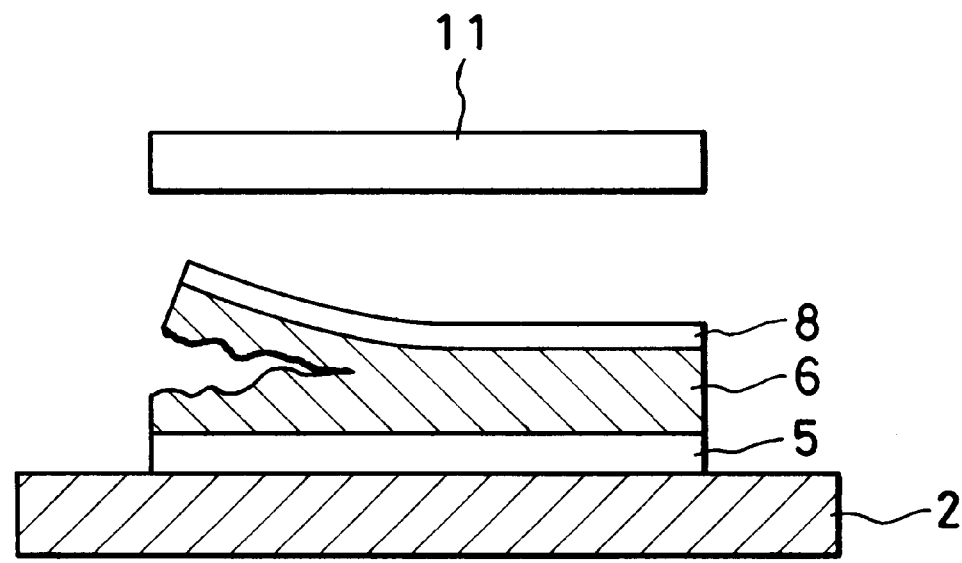
FIG. 5(b) is illustrative of what happens when the hologram layer is peeled off.

FIG. 5(a) a sectional view of a hologram seal portion of the third multilayer volume hologram of the invention, and FIG. 5(b) is illustrative of what happens when the hologram layer is peeled off.

Figure 6A:
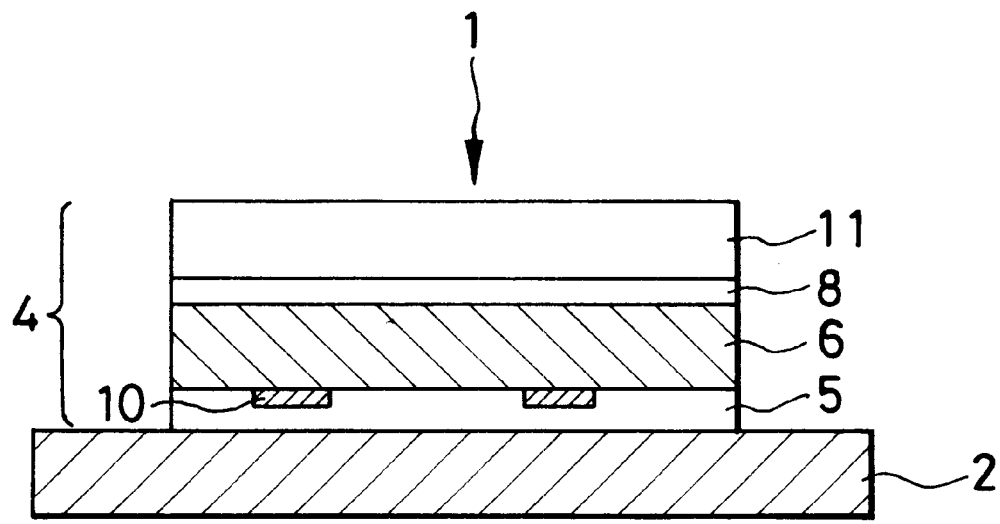
FIG. 6(a) a sectional view of another embodiment of the third multilayer volume hologram of the invention.
Figure 6B:
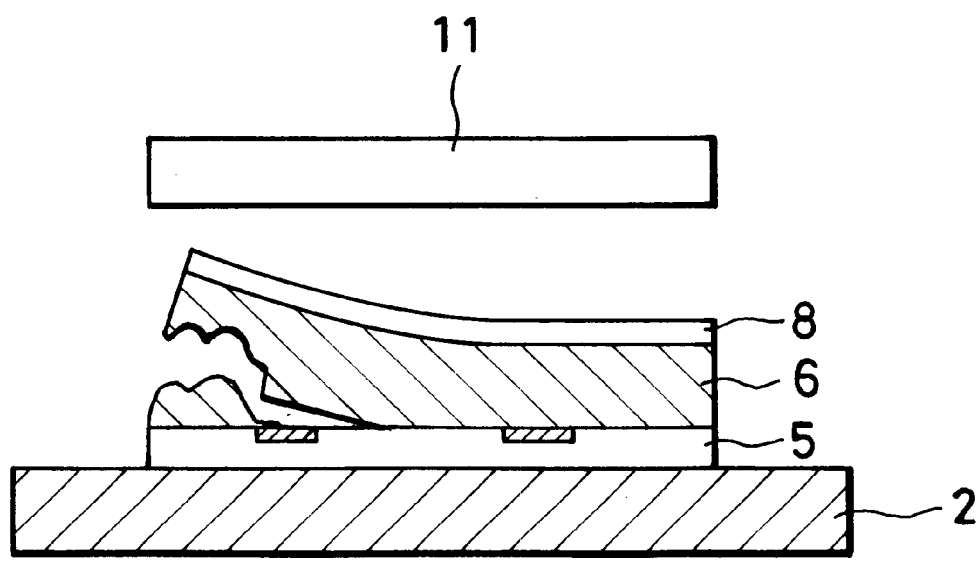
FIG. 6(b) is illustrative of what happens when the hologram layer is peeled off.

FIG. 6(a) is a sectional view of a hologram seal portion of the third multilayer volume hologram of the invention in the case where the layer 10 capable of making adhesion strength between both layers partially different is provided, and FIG. 6(b) is illustrative of what happens when the hologram layer is peeled off.

Throughout FIGS. 1 to 6, reference numeral 1 stands for an ID card such as a certificate for examination, 2 an application member, 3 a portrait, 4 a hologram seal, 5 an adhesive layer or a firth adhesive layer, 6 a volume hologram layer, 7 a surface protective film, 8 a surface protective coating film, 9 a second adhesive layer, 10 a layer capable of making adhesion strength between both layers partially different, and 11 a protective substrate.

The first to third multilayer volume holograms of the invention are now explained with reference to FIG. 1 wherein the application member takes the form of a certificate for examination. As shown in FIGS. 1(a) and 1(b), the personal information such as a name and examinee's number is put down on the certificate, and the portrait 3 is pasted thereon. Identifying data about the individual who carries the certificate are written on an information area. The information area in a seal form is pasted on the certificate, as in the case of the portrait. The hologram seal is laminated on the these portrait 3 and information areas. A school name or badge bearing hologram image is recorded in the volume hologram layer with interference fringes corresponding to a hologram interference pattern.

For the application member 2, a sheet of film form of paper, synthetic paper, synthetic resin or metal may be used.

Use may also be made of a sheet form of certificate for examination as shown in FIG. 1, a card such as an ID card or a booklet form of passport. The photographic paste may have an adhesion strength with which the portrait cannot be detached from the application member, and so may be generally available starch paste or synthetic paste.

For the portrait forming a part of the application member, known photographic materials represented by silver salt, sublimation transfer images, etc. may be used. Instead of the portrait, an image indicating the finger print, palm print, etc. of the individual may be used. When, for instance, the certificate is an admission certificate for a sport event or the like, monochromatic or polychromatic numerals, characters, etc. may be indicated on the information area of the certificate by means of printing, a thermal head or an ink jet. Furthermore, the name of the site, whether or not the individual who carries the certificate is a player, qualifications, sponsor's instructions, etc. may be indicated on the information area.

The first multilayer volume hologram of the invention is now explained. In the first multilayer volume hologram, the adhesive layer 5, volume hologram 6 and surface protective film 7 are laminated on the application member 2 in this order, as shown in FIG. 2(*a*).

In the first multilayer volume hologram of the invention, the breaking strength of the hologram layer should be larger than the peel strength between the surface protective film and the volume hologram layer and smaller than the peel strength with which the hologram layer is peeled off the application member and the breaking strength of the surface protective film.

The volume hologram layer 6 is a photosensitive material layer in which light of interference between object light and reference light is recorded so that the three-dimensional structure of an object is recorded as such, said layer having a thickness much larger than the spacing between interference fringes. This volume hologram layer 6 is formed by recording light of interference between object light and reference light directly in a volume hologram-forming material or subjecting a master hologram in close contact with the hologram-forming material to exposure to light. The latter process is used for industrial purposes.

For the volume hologram-forming material, all known volume hologram recording materials such as silver-salt materials, dichromated gelatin emulsions, photo-polymerizable resins and photo-crosslinkable resins may generally be used. In consideration of production efficiency, however, it is preferable to use for the volume hologram-forming material a photosensitive material suitable for a dry volume hologram recording application, which comprises a matrix polymer, a photo-polymerizable compound, a photo-polymerization initiator and a sensitizing dye.

For the matrix polymer that is a binder resin, use may be made of copolymers (or a mixture thereof) comprising as a polymerization component or components at least one copolymerizable component selected from the group consisting of polymethacrylic acid ester or its partial hydrolysate, polyvinyl acetate or its hydrolysate, polyvinyl alcohol or its partially acetallized product, triacetyl cellulose, polyisoprene, polybutadiene, polychloroprene, silicone rubber, polystyrene, polyvinyl butyral, polyvinyl chloride, chlorinated polyethylene, chlorinated polypropylene, poly-N-vinylcarbazole or its derivative, poly-N-vinylpyrrolidone or its derivative, copolymer of styrene and maleic anhydride or its half ester, acrylic acid, acrylic acid ester, methacrylic acid, methacrylic acid ester, acrylamide, acrylnitrile, ethylene, propylene, vinyl chloride and vinyl acetate. For the matrix polymer, it is more preferable to use polyisoprene, polybutadiene, polychloroprene, polyvinyl alcohol, polyvinyl acetal that is a partially acetallized product of polyvinyl alcohol, polyvinyl butyral, polyvinyl acetate, and vinyl chloride-vinyl acetate copolymer which may be used alone or in admixture.

The recorded hologram is stabilized by the step of migrating the monomers by heating. To this end, it is required that these matrix polymers have such a relatively low glass transition temperature as to facilitate the migration of monomers.

The photo-polymerizable compounds used herein, for instance, include photo-polymerizable, photo-linkable monomers, oligomers and prepolymers, each containing at least one ethylenical unsaturated bond per molecule as will be explained later, which may be used alone or in admixture. Exemplary compounds are unsaturated carboxylic acids or their salts, esters of unsaturated carboxylic acids and aliphatic polyvalent alcohol compounds, and amide combined products of unsaturated carboxylic acids and aliphatic polyvalent amine compounds.

Exemplary unsaturated carboxylic acid monomers are acrylic acid, methacrylic acid, itaconic acid, crotonic acid, isocrotonic acid and maleic acid as well as their halogen-substituted unsaturated carboxylic acids such as chlorinated unsaturated carboxylic acids, brominated unsaturated carboxylic acids and fluorinated unsaturated carboxylic acids. Examples of the salts of unsaturated carboxylic acids are sodium, potassium or like salts of the aforesaid acids.

The ester monomers of aliphatic polyvalent alcohol compounds and unsaturated carboxylic acids may include those classified as acrylic acid esters, for instance, ethylene glycol diacrylate, triethylene glycol diacrylate, 1,3-butanediol diacrylate, tetramethylene glycol diacrylate, propylene glycol diacrylate, neopentyl glycol diacrylate, trimethylol-prpane triacrylate, trimethylolpropane tri (acryloyloxypropyl) ether, trimethylolethane triacrylate, hexanediol diacrylate, 1,4-cyclohexanediol diacrylate, tetra-ethylene glycol diacrylate, pentaerythritol diacrylate, pentaerythritol triacrylate, pentaerythritol tetraacrylate, dipentaerythritol diacrylate, dipentaerythritol triacrylate, dipentaerythritol tetraacrylate, dipentaerythritol hexaacrylate, sorbitol triacrylate, sorbitol tetraacrylate, sorbitol pentaacrylate, sorbitol hexaacrylate, tri (acryloyloxyethyl) isocyanurate, polyester acrylate oligomer, 2-phenoxyethyl acrylate, 2-phenoxyethyl methacrylate, phenol ethoxylate monoacrylate, 2-(p-chlorophenoxy)ethyl acrylate, p-chlorophenyl acrylate, phenyl acrylate, 2-phenylethyl acrylate, (2-acryloxyethyl) ether of bisphenol A, ethoxylated bisphenol A diacrylate, 2-(1-naphthyloxy)ethyl acrylate, o-biphenyl methacrylate and o-biphenyl acrylate.

The ester monomers of aliphatic polyvalent alcohol compounds and unsaturated carboxylic acids may include those classified as methacrylic acid esters, for instance, tetramethylene glycol dimethacrylate, triethylene glycol dimethacrylate, neopentyl glycol dimethacrylate, trimethylolpropane trimethacrylate, trimethylolethane trimethacrylate, ethylene glycol dimethacrylate, 1,3-butanediol dimethacrylate, hexanediol dimethacrylate, pentaerythritol dimethacrylate, pentaerythritol trimethacylate, pentaerythritol tetramethacrylate, dipentaerythritol dimethacrylate, dipentaerythritol hexamethacrylate, sorbitol trimethacrylate, sorbitol tetramethacrylate, bis-[p-3-methacryloxy-2-hydroxypropoxy) phenyl]

dimethylmethane, bis-[p-(acryloxyethoxyphenyl] dimethylmethane, 2,2-bis(4-methacryloyloxyphenyl) propane, and mehacrylic acid-2-naphthyl.

The ester monomers of aliphatic polyvalent alcohol compounds and unsaturated carboxylic acids may include those classified as itaconic acid esters, for instance, ethylene glycol diitaconate, propylene glycol diitaconate, 1,3-butanediol diitaconate, 1,4-butanediol diitaconate, tetrametylene glycol diitaconate, pentaerythritol diitaconate and sorbitol tetraitaconate.

The ester monomers of aliphatic polyvalent alcohol compounds and unsaturated carboxylic acids may include those classified as crotonic acid esters, for instance, ethylene glycol isocrotonate, tetramethylene glycol dicrotonate, pentaerythritol dicrotonate, and sorbitol tetraocrotonate.

The ester monomers of aliphatic polyvalent alcohol compounds and unsaturated carboxylic acids may include those classified as isocrotonic acid esters, for instance, ethylene glycol diisocrotonate, pentaerythritol diisocrotonate, and sorbitol tetraisocrotonate.

The ester monomers of aliphatic polyvalent alcohol compounds and unsaturated carboxylic acids may include those classified as maleic acid esters, for instance, ethylene glycol dimaleate, triethylene glycol dimaleate, pentaerythritol dimaleate, and sorbitol tetramaleate.

The halogenated unsaturated carboxylic acids used herein include 2,2,3,3-hetrafluoropropyl acrylate, 1H,1H,2H,2H-heptadecafluorodecyl acrylate, 2,2,3,3-tetrafluoropropyl methacrylate, 1H,1H,2H,2H-heptadecafluorodecyl methacrylate, methacrylic acid-2,4,6-tribromophenyl, dibromoneopentyl dimethacrylate (available under the trade name of NK Ester DBN, Shin-Nakamura Chemical Industries, Ltd.), dibromopropyl acrylate (available under the trade name of NK Ester A-DBP, Shin-Nakamura Chemical Industries, Ltd.), dibromopropyl methacrylate (available under the trade name of NK Ester DBP, Shin-Nakamural Chemical Industries, Ltd.), methacrylic acid chloride, methacrylic acid-2,4,6-trichlorophenyl, p-chlorostyrene, methyl-2-chloroacrylate, ethyl-2-chloroacrylate, n-butyl-2-chloroacrylate, tribromophenol acrylate, and tetrabromophenol acrylate.

The amides of unsaturated carboxylic acids and aliphatic polyvalent amine compounds may include methylenebisacrylamide, methylenebismethacrylamide, 1,6-hexamethylenebisacrylamide, 1,6-hexamethylene-bismethacrylamide, diethylenetriaminetrisacrylamide, xylylenebisacrylamide, xylylenebismethacrylamide, N-phenylmethacrylamide, and diacetone acrylamide.

Besides, the photo-polymerizable compounds may include polyisocyanate compounds having two or more isocyanate groups per molecule, as described in JP-B 48-41708, vinylurethane compounds having two or more polymerizable vinyl groups per molecule, with the addition thereto of a hydroxyl group-containing vinyl monomer represented by $CH_2=C(R)COOCH_2CH(R')OH$ where R and R' each stand for a hydrogen atom or a methyl group), etc.

Urethane acrylates as set forth in JP-A 51-37193, and polyester acrylates, epoxy resins and polyfunctional acrylates or methacrylates such as (meth)acrylic acids as shown in JP-A 48-64183 and JP-B's 49-43191 and 52-30490, respectively, may also be used in the present invention. In addition, compounds referred to as photo-curable monomers and oligomers in The Journal of Adhesion Society of Japan, Vol. 20, No. 7, pp. 33–308 may be used.

For the photo-polymerizable compounds used herein, use may further be made of phosphorus-containing compounds such as mono(2-acryloyloxyethyl) acid phosphate (available under the trade name of Light Ester PA, Kyoeisha Oil & Fat Chemical Industries, Ltd.), mono(2-methacryloyloxyethyl) acid phosphate (available under the trade name of Light Ester PM, Kyoeisha Oil & Fat Chemical Industries, Ltd.), and epoxy acrylate compounds (available under the trade names of Ripoxy VR-60 and Ripoxy VR-90, Showa Polymer Co., Ltd.).

For the photo-polymerizable compounds used herein, use may further be made of commercial products available under the trade names of NK Ester M-230G and NK Ester 23G, Shin-Nakamura Chemical Industries, Ltd.).

Use may further be made of triacrylates having the following structural forulae and available under the trade names of Alonix M-315 and Alonix M-325, Toa Synthesis Chemical Industries, Ltd.):

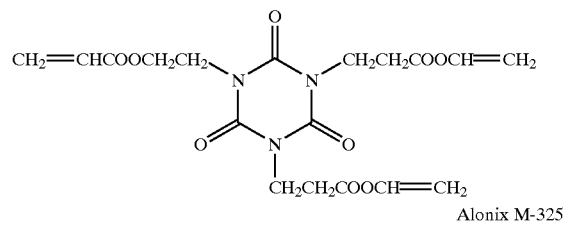

Alonix M-315

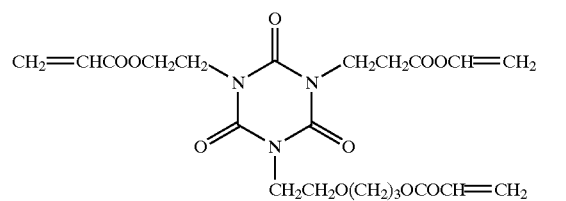

Alonix M-325

Use may further be made of 2,2'-bis(4-acryloxy·diethoxyphenyl)propane (available under the trade name of NK Ester A-BPE-4, Shin-Nakamura Chemical Industries, Ltd.), tetramethylolmethane tetraacrylate (available under the trade name of NK Ester A-TMMT, Shin-Nakamura Chemical Industries, Ltd.), etc.

For the photo-polymerization initiator in the initiator system, for instance, 1,3-di(t-butyldioxycarbonyl) benzophenone, 3,3',4,4'-tetrakis(t-butyldioxycarbonyl) benzophenone, N-phenylglycine, 2,4,6-tris (trichloromethyl)-s-triazine, 3-phenyl-5-isooxazolone, 2-mercaptobenzimidazole, and imidazole dimers may be used.

In view of the stabilization of the recorded hologram, the photo-polymerization initiator should preferably be removed by decomposition after hologram recording. For instance, organic peroxide initiators are preferred because of being easy to decompose by ultraviolet irradiation.

Exemplary senstizing dyes are those having absorption light at 350 to 600 nm such as thiopyrylium salt dyes, merocyanine dyes, quinoline dyes, styrylquinoline dyes, ketocoumarin dyes, thioxanthene dyes, xanthene dyes, oxonol dyes, cyanine dyes, rhodamine dyes, pyrylium ion dyes, and diphenylidonium ion dyes. It is here noted that it is acceptable to use sensitizing dyes having absorption light at a wavelength less than 350 nm or greater than 600 nm.

The proportion of the volume hologram-forming material comprising the aforesaid matrix polymer, photo-polymerizable compound, photo-polymerization initiator and sensitizing dye is given below. The photo-polymerizable compound should be used in an amount of 1 part by weight to 100 parts by weight, and preferably 5 parts by weight to 10 parts by weight, per 100 parts by weight of binder resin. The photo-polymerization initiator should be used in an amount of 1 part by weight to 10 parts by weight, and preferably 5 parts by weight to 10 parts by weight, per 100 parts by weight of binder resin. The sensitizing dye should be used in an amount of 0.01 part by weight to 1 part by weight, and preferably 0.01 part by weight to 0.5 parts by weight, per 100 parts by weight of binder resin. Other volume hologram-forming materials, for instance, are plasticizers, glycerin, diethylene glycol, triethylene glycol and a variety of nonionic, anionic and cationic surface active agents.

The volume hologram-forming material is dissolved in a suitable solvent such as acetone, methyl ethyl ketone, methyl isobutyl ketone, cyclohexanone, benzene, toluene, xylene, chlorobenzene, tetrahydrofran, methyl cellosolve, ethyl cellosolve, methyl cellosolve acetate, ethyl cellosolve acetate, ethyl acetate, 1,4-dioxane, 1,2-dichloroethane, dichloromethane, chloroform, methanol, ethanol and isopropanol or a mixture thereof to form a coating solution having a solid content of 15% to 25%.

For the hologram-recording material, it is acceptable to use a photo-polymerizable composition comprising a binder resin, a radical photo-polymerizing initiator, a cationic photo-polymerizing initiator, a sensitizing dye, a radical polymerizable monomer and a cationic polymerizable monomer.

If the support film is in a sheet form, the coating solution may be applied thereto by means of bar coating, spin coating, dipping or the like, and if the support film is a roll or continuous form, the coating solution may be applied thereto by means of gravure coating, roll coating, die coating, comma coating or the like. In either case, the coating solution is solidified by drying or curing means fitting for the type of the coating solution used. The thus obtained volume hologram-forming material has a thickness of 0.1 µm to 50 µm, and preferably 5 µm to 20 µm.

Using two-beam laser light, e.g., an argon ion laser of 514.5 nm wavelength or a krypton ion laser of 647 nm wavelength, interference fringes or light of interference between object light and reference light are recorded in the volume hologram-forming layer. Alternatively, a master volume hologram is brought into close contact with the volume hologram-forming layer from which the protective film is removed. Then, an argon ion laser of 514.5 nm is entered into the volume hologram-forming layer side, so that fringes of inteference between the light reflected from the master hologram and the incident light can be recorded in the volume hologram-recording layer to impart volume hologram information thereto.

Thereafter, the volume hologram-recording layer with a volume hologram recorded therein is processed into a stable volume hologram layer through the steps of heating the recording layer at 100° C. for 10 minutes, thereby diffusing and migrating the photo-polymerizable compound, and irradiating the recording layer with ultraviolet radiation of 0.1 to 10,000 mJ/cm$^2$, and preferably 10 to 5,000 mJ/cm$^2$ from a light source such as an ultra-high-pressure mercury lamp, a high-pressure mercury lamp, a carbon arc, a xenon arc or a metal halide lamp, thereby decomposing the photo-polymerization initiator.

In the state where the volume hologram layer of the present invention with volume hologram recorded therein is treated by heating and ultraviolet irradiation, the volume hologram layer should have a glass transition temperature of 50° C. or higher, preferably 80° C. or higher, and more preferably 100° C. or higher. It is here noted that there is no critical upper limit to the glass transition temperature. This ensures that there is no adverse influence on the hologram recorded.

In the aforesaid state, the volume hologram layer should have a breaking strength of 0.01 kgf/mm$^2$ to 5 kgf/mm$^2$ and preferably 0.03 kgf/mm$^2$ to 3 kgf/mm$^2$, and a breaking elongation of 0.01% to 30% and preferably 0.1% to 10%. Thus, this volume hologram layer is so brittle that when forcibly peeled off, it breaks down in itself. In this connection, "OmniDex 800X" (Du Pont) that is a typical volume hologram-recording material has a glass transition temperature of 50° C. or lower and a breaking strength of 2.30 kgf/mm$^2$ upon treated in the same manner. However, this recording material is of no brittleness as can be seen from its breaking elongation of 138%.

The glass transition temperature of the volume hologram layer is measured under the following conditions.
Measuring Device: Solid Viscoelasticity Analyzer RSA-II (Reometrics Co., Ltd.)
Measuring Mode: Tensile load on film
Measuring Frequency: 6.28 rad/s
(1) A sample is set at a film tensile testing jig.
(2) In any desired region, the sample is measured for its dependency on temperature at a frequency of 6.28 rad/s to find a peak temperature for tanδ, which is herein defined as the glass transition temperature of the sample.

The breaking strength and breaking elongation of the volume hologram layer may be measured using a tensile compression testing machine SV-201-1 made by Imada Seisakusho Co., Ltd. according to JIS K7127-1989 under the following conditions:
Measuring Atmosphere: 25° C., 50% RH
Testing Piece: 25 mm in width
Stress Rate: 200 mm/min.

The breaking strength of the surface protective layer according to the present invention may be measured in the same manner as mentioned above. In this regard, the surface protective layer should have a breaking strength of 10 kgf/mm$^2$ or greater, and preferably 15 kgf/mm$^2$ or greater in both its MD (lengthwise direction) and TD (widthwise direction) directions.

The peel strength in kgf/25 mm between the surface protective film and the volume hologram layer or between the application member and the hologram layer may be measured using 180° peel testing (Tensile Compression Testing Machine SV-201-E made by Imada Seisakusho Co., Ltd.) according to JIS Z0237.
Measuring Atmosphere: 25° C., 50% RH
Test Piece: 25 mm in width
Lamination: Compression at one stroke of 2 kg rubber roll
Lamination time: Sixty minutes after lamination
Peel Angle: 180°
Peel Rate: 250 mm/min.

In the first multilayer volume hologram, the breaking strength ($\beta$) of the volume hologram should be larger than the peel strength ($\alpha$) between the surface protective film and the volume hologram layer.

The peel strength ($\alpha$) between the surface protective film and the volume hologram layer should preferably be of the order of 0.005 kgf/25 mm to 0.05 kgf/25 mm. For instance, this peel strength may be achieved by forming the volume hologram-forming layer on the surface protective layer by coating, and then recording a hologram in the volume hologram-recording layer. At the same time, the breaking strength (β) of the volume hologram layer should be smaller than the peel strength (γ) with which the hologram layer is peeled off the application member and the breaking strength (δ) of the surface protective film. The peel strength (γ) with which the hologram layer is peeled off the application member should preferably be of the order of 1 kgf/25 mm to 10 kgf/25 mm. This peel strength may be obtained by laminating the volume hologram layer on the application member with an adhesive layer interleaved between them.

In short, the breaking strengths (β) and (δ) and peel strengths (α) and (γ) should have such relations as given by α<β<<γ·δ, where << means much greater than, and the magnitudes of γ and δ are not critical. The same goes for other multilayer volume holograms.

FIG. 2(b) is illustrative of what happens upon a forced peeling of the hologram seal 4 from the application member 2. As shown in FIG. 2(b), the surface protective film 7 can be released from the volume hologram layer 6 with no breakdown thereof. However, when the volume hologram 6 is forcibly peeled off the application member 2, the volume hologram layer 6 breaks down due to a cohesive failure and so can no longer be reused. This is because the peel strength with which the hologram layer is peeled off the application member is larger than the breaking strength of the volume hologram layer.

In numerical parlance, the breaking strength cannot be directly compared with the peel strength. However, if the breaking strengths of the volume hologram layer, surface protective layer and adhesive layer are predetermined corresponding to the respective materials together with the peel strength between adjacent layers, it is then possible to determine the magnitudes of those strengths through experimentation in such a way as to cause the cohesive failure. The same holds true for other multilayer volume holograms according to the present invention.

The surface protective film 7, for instance, may be formed of films such as polyethylene films, polypropylene films, polyethylene fluoride films, polyvinylidene fluoride films, polyvinyl chloride films, polyvinylidene chloride films, ethylene-vinyl alcohol films, polyvinyl alcohol films, polymethyl methacrylate films, polyether sulfone films, polyether ether ketone films, polyamide films, tetrafluoroethylene-perfluoroalkylvinyl ether copolymer films, polyethylene terephthalate films, and polyimide films, and has a thickness of 2 μm to 200 μm, preferably 10 μm to 50 μm. If required, the surface protective film may be subjected to a hard coat treatment. To this end, for instance, a silicone hard coat, a fluorine-containing hard coat, a melamine alkyl hard coat, or an urethane-acrylate hard coat (of the ultraviolet curing type) of 1 μm to 50 μm in thickness may be applied on the surface protective layer by dipping, spraying, roll coating or the like.

In the second mutilayer volume hologram to be described later, the hard coated surface of the surface protective film 7 should preferably be subjected to a releasing treatment so as to prevent other film from being applied over the surface protective film for faking purposes. The releasing treatment may be carried out by coating a fluorine-base releasing agent, a silicone-base releasing agent, a stearic acid-base releasing agent, a wax-base releasing agent or the like on the hard coated surface by means of dipping, spraying, roll coating or the like.

The adhesive layer used herein, for instance, may be formed of acrylic resins, acrylate ester resins or copolymers thereof, styrene-butadiene copolymers, natural rubber, casein, gelatin, rosin ester, terpene resins, phenol resins, styrene resins, coumaron-indene resins, polyvinyl ether and silicone resins. Also, use may be made of α-cyanoacrylate adhesives, silicone adhesives, maleimide adhesives, styrol adhesives, polyolefin adhesives and polyvinyl ether adhesives. The adhesive layer should preferably have a thickness of 4 μm to 30 mm.

Although not illustrated, the adhesive layer 5 for bonding the hologram layer to the application member 2 should preferably contain a colored layer. This colored layer forms a background color for the volume hologram, so that a hologram image of enhanced contrast can be obtained. The same holds true for other multilayer volume holograms of the present invention. Although the adhesive layer itself may be colored, it is understood that this is not preferable because the coloring agent incorporated passes into the hologram layer and so has an adverse influence on the image recorded therein.

One exemplary colored layer-containing adhesive layer is a multilayer structure comprising an adhesive layer/colored layer/adhesive layer. For the colored layer, a colored adhesive layer, a printed layer, a light reflective layer, a colored resin film, etc. may be used.

In the colored adhesive layer, pigments and/or dyes may be incorporated as the coloring agent in a transparent adhesive agent. Exemplary pigments are black pigments such as carbon black, copper-iron-manganese and Aniline Black; powders of metals such as Cr, Ti, Fe, Co, Ni, Cu, Ag, Au, Ge, Al, Mg, Sb, Pb, Pd, Cd, Bi, Sn, Se, In, Ga and Rb and their oxides and nitrides, which may be used alone or in combination of two or more; other colored pigments such as Naphtol Red F5RK and Phthalocyanine Blue; and infrared reflective pigments. These pigments may be used alone or in admixture. When a colored infrared reflective pigment is used as the pigment, the back layer in the hologram recording layer can be placed in a state different from visible light. The pigment used herein should preferably have an average particle diameter of 10 μm or less, and especially 1 μm or less. Exemplary dyes are black dyes such as Acid Black, Chrome Black and Reactive Black, and dyes such as Disperse Red, Cation Blue and Cation Yellow, which may be used alone or in admixture.

The amount of the pigment or dye incorporated in the adhesive layer should be 1% by weight to 40% by weight, and preferably 10% by weight to 30% by weight. The colored adhesive layer formed by coating should preferably have a thickness of 1 μm to 100 μm, preferably 5 μm to 30 μm and an O.D. value of 1.5 or greater, preferably 1.9 or greater, and absorb at least 50%, and preferably at least 80%, of light having a diffraction wavelength through the volume hologram layer, so that a hologram image of excellent contrast can be obtained.

For the printed layer, it is preferable to use a layer which comprises a solidly printed area with a printing ink and/or a character pattern area, and should be transferred as such on the adhesive layer.

For the light reflective layer, use may be made of a metal thin film which can be arranged as such on the adhesive layer. For instance, use may be made of thin films of metals such as Cr, Ti, Fe, Co, Ni, Cu, Ag, Au, Ge, Al, Mg, Sb, Pb, Pd, Cd, Bi, Sn, Se, In, Ga and Rb and their oxides and nitrides, which may be used alone or in combination of two or more. Of these, thin films of Al, Cr, Ni, Ag and Au are especially preferred with a thickness of 1 to 10,000 nm, and preferably 20 to 200 nm.

For the colored resin film, for instance, a colored resin film comprising a transparent plastic film with a coloring agent incorporated therein, and a transparent plastic film with a colored layer provided thereon may be used.

The first multilayer volume hologram is fabricated using a label for the fabrication of the first multilayer hologram. The label for the fabrication of the first multilayer hologram comprises the first multilayer hologram shown in FIG. 2(a), wherein a release sheet is used in place of the application member 2.

For the release sheet, for instance, use may be made of films such as polyethylene films, polypropylene films, polyethylene fluoride films, polyvinylidene fluoride films, polyvinyl chloride films, polyvinylidene chloride films, ethylene-vinyl alcohol films, polyvinyl alcohol films, polymethyl methacrylate films, polyether sulfone films, polyether ether ketone films, polyamide films, tetrafluoroethylene-perfluoroalkylvinyl ether copolymer films, polyethylene terephthalate films and polyimide films, which have been treated thereon with a fluorine-base or silicone-base releasing agent, and have a thickness of 2 μm to 200 μm, preferably 10 μm to 50 μm. The release sheet may also be formed of a transparent film or an opaque film kneaded with a shielding pigment such as carbon black, which may be in a sheet or roll form. In use, the release sheet is released from the label for the fabrication of the first multilayer hologram of the present invention. Then, the label is laminated on the adhesive layer side over an application member, so that the first multilayer hologram of the present invention can be obtained.

On example of how to prepare the label for the fabrication of the first multilayer hologram of the present invention is now given below.

A first multilayer structure (1) and a second multilayer structure (2) are separately provided. The first multilayer structure (1) comprises a surface protective film/hologram-forming material layer/releasable sheet, and the second multilayer structure (2) comprises a releasable sheet/adhesive layer/releasable sheet.

First, a hologram is recorded in the hologram-recording medium in the first multilayer structure, followed by a heat treatment. Then, the releasable sheet is released from the first multilayer structure. The second multilayer structure, from which the releasable sheet is released, is laminated on the exposed hologram layer surface to make a mutilayer structure comprising a surface protective film/hologram layer/adhesive layer/releasable sheet. This structure is irradiated with ultraviolet rays from a high-pressure mercury lamp for the fixation of the volume hologram layer. The fixing treatment using a high-pressure mercury lamp may be carried out subsequent to the step where the hologram is recorded in the hologram-recording medium and then heat treated.

The second multilayer volume hologram of the present invention is now explained. As shown in FIG. 3(a), the surface protective film 7 in the first multilayer volume hologram is treated in such a way that its adhesion for the volume hologram layer 6 is enhanced. The layer arrangement of the second multilayer volume hologram is the same as that of the first multilayer volume hologram with the exception of the peel strength between the surface protective film 7 and the volume hologram layer 6.

To enhance the adhesion of the surface protective film for the volume hologram layer, it is preferable to rely on any one of the following methods, wherein:

(1) the side of the surface protective film opposite to the volume hologram layer is treated with corona, flame or the like, and the hologram-forming material is then coated thereon to form a volume hologram layer;

(2) the surface protective film is anchor treated on the surface side using an anchor agent such as urethane acrylic copolymers, polyester resins or the like, and the hologram-forming material is then coated on the anchor treated surface to form a volume hologram layer; and (3) an adhesive layer is interposed between the surface protective film and the volume hologram layer, using the adhesive agent explained with reference to the first multilayer volume hologram.

In the second multilayer volume hologram, it is desired that the peel strength (α) between the surface protective film and the volume hologram layer be larger than the breaking strength (β) of the hologram layer and, at the same time, the peel strength (α) between the surface protective film and the volume hologram layer be smaller than the peel strength (γ) between the application member and the volume hologram layer and the breaking strength (δ) of the surface protective film. That is, these breaking and peel strengths have such relations as shown by $\beta < \alpha << \gamma \cdot \delta$.

The peel strength (α) between the surface protective layer and the volume hologram layer should preferably be of the order of 0.3 kgf/25 mm to 5 kgf/25 mm. The strengths β, γ and δ are the same as explained with reference to the first multilayer volume hologram.

FIG. 3(b) is illustrative of what happens upon a forcible peeling of the hologram layer 6 together with the surface protective film 7 from the application member 2. As shown in FIG. 3(b), when the volume hologram 6 is forcibly peeled off the application member 2, the volume hologram layer 6 breaks down due to a cohesive failure and so can no longer be reused.

When the surface protective film 7 is laminated on the volume hologram layer 6 with the second adhesive layer 9 interleaved between them as shown in FIG. 4(a), it is desired that between the volume hologram layer 6 and the second adhesive layer 9 and/or between the volume hologram layer 6 and the first adhesive layer 5 (not shown), there be patterned a layer or layers 10 which makes or make the adhesion strengths of both layers partially different from each other. The layer or layers will hereinafter be often called a pattern or patterns 10.

When one pattern 10 is interleaved only between the first adhesive layer 5 and the hologram layer 6, the second adhesive layer 9 may contain, in addition to the aforesaid adhesive agent, a heat seal agent provided resins such as ethylene-vinyl acetate copolymer resins, polyamide resins, polyester resins, polyethylene resins, ethylene-isobutyl acrylate copolymer resins, butyral resins, polyvinyl acetate resins and their copolymer resins, cellulose derivatives, polymethyl methacrylate resins, polyvinyl ether resins, polyurethane resins, polycarbonate resins, polypropylene resins, epoxy resins or phenol resins. Alternatively, use may be made of thermoplastic elastomers such as SBS (styrene-butadiene-styrene block copolymer), SIS (styrene-isoprene-styrene block copolymer) and SEBS (styrene-ethylene-butylene-styrene block copolymer), and reactive hot melt resins.

The first adhesive layer 5, and the second adhesive layer 9 may be formed with a thickness of 4 μm to 30 μm, using such materials as mentioned above.

The adhesion strength (γ) between the application member 2 and the hologram layer 6 should be larger, and preferably at least 0.1 kgf/25 mm larger, than the adhesion strength (α) between the hologram layer 6 and the surface protective film 7. To this end, it is preferable to use adhesive agents varying in adhesion force or adhesive agents with varying adhesion strengths. In the latter case, two different adhesive agents are used at a varying mixing ratio to obtain a suitable adhesion strength difference. Alternatively, the common main component adhesive agent may be used together with varying amounts of additives such as an isocyanate or other crosslinking agent or a tackifier to obtain an adhesion strength difference.

For the pattern 10, a layer capable of decreasing or increasing adhesion strength may be used. The layer capable of diminishing adhesion strength should preferably be formed by coating of a coating material comprising an adhesive layer-forming adhesive agent and a releasing agent added thereto. When different types of adhesive agents are used, there is a possibility that the applied releasing pattern may be detected from the outside due to a refractive index difference. For instance, the releasing agent used herein may be those based on fluorine, silicone, stearic acid and wax, and is used in an amount of 1 part by weight to 20 parts by weight per 100 parts by weight of the adhesive agent. At greater than 20 parts by weight, the adhesion of the releasing agent to the adhesive layer decreases and the refractive index of the releasing agent is noticeably different from that of the adhesive layer; the applied releasing pattern may be detected from the outside. The layer 10 capable of decreasing the adhesion strength between both layers should preferably be patterned on the surface of the adhesive layer at a post-drying thickness of 1 $\mu$m to 3 $\mu$m by means of gravure printing, silk printing, pad printing or the like.

It is here noted that when the adhesive agent(s) in the first and/or second adhesive layers shows a varying adhesion to the hologram layer upon irradiated with ionizing radiation such as ultraviolet radiation or electron beams, the first and/or second adhesive layers may be irradiated with the ionizing radiation in a patterned form for partial crosslinking, thereby forming the pattern 10.

The adhesive layer, and the layer capable of decreasing adhesion strength may be formed by coating the adhesive agent on the releasable surface of a releasable sheet called a separator to form the adhesive layer, then laminating the layer capable of decreasing adhesion strength on the surface thereof in a patterned fashion by means of transfer or the like, and finally thermo-compressing the patterned layer onto the surface of the hologram layer. One separator may be used, when the separator is used just upon coated with the adhesive agent. Alternatively, the separator may be used in a "double-faced tape" form comprising two separator pieces wherein one is peeled off for bonding and then another is peeled off for bonding. These methods may be selectively used.

In the case where between the second adhesive layer 9 and the hologram layer 6 there is patterned the layer capable of diminishing the adhesion strength between both layers, the portion of the hologram layer 6 contiguous to the pattern 10 does not broke down even upon a forced peeling of the volume hologram layer, as shown in FIG. 4(*b*). However, other portion of the hologram layer 6 between the first and second adhesive layers breaks down due to a cohesive failure. Thus, the hologram layer 6 breaks down according to the pattern 10, and so cannot possibly be reused.

The pattern 10 may be formed of a layer capable of partially increasing adhesion strength. In this case, the releasing pattern for the volume hologram layer is reverse to that for the layer capable of diminishing adhesion strength. For the layer capable of enhancing adhesion strength, it is preferable to form the pattern 10 using an adhesive agent such as an acrylic, urethane, acrylic urethane or polyester resin base adhesive agent which has an adhesion strength larger than that of the aforesaid adhesive layer, optionally with an additive such as an isocyanate or other crosslinking agent or a tackifier resin.

The layer capable of partially increasing adhesion strength may be patterned on the adhesive layer with a thickness of 0.1 $\mu$m to 5.0 $\mu$m, preferably 0.5 $\mu$m to 3 $\mu$m by means of gravure printing, silk printing, pad printing or the like as in the case of the layer capable of partially diminishing adhesion strength. A thickness greater than 3 $\mu$m is not preferred because a cohesive failure occurs in the pattern 10 layer or the applied pattern 10 may be detected from the outside due to a refractive index difference. When patterns 10 are used at a plurality of sites, it is allowed to use the layers capable of decreasing and increasing adhesion strength in combination.

It is preferable to form the pattern 10 on the surface of the adhesive layer, on which the hologram is to be laminated, in spot, streak, grating or other patterns or in the form of symbols, characters, etc. More preferably, words such as "used", "invalid" or "opened" indicating that the hologram layer is peeled off are formed by coating on the surface of the adhesive layer, so that more improved counterfeit-proofness is achievable.

How to make the label for the fabrication of the second multilayer volume hologram is now explained.

A first multilayer structure (1) and a second multilayer structure (2) are separately furnished. The first multilayer structure (1) comprises a surface protective film whose side to be laminated is easily bondable/hologram-forming material layer/releasable sheet, and the second multilayer structure (2) comprises a releasable sheet/adhesive layer/releasable sheet.

First, a hologram is recorded in the hologram-recording medium in the first multilayer structure, followed by a heat treatment. Then, the releasable sheet is released from the first multilayer structure. The second multilayer structure, from which the releasable sheet is released, is laminated on the exposed hologram layer surface at room temperature to make a mutilayer structure comprising a surface protective film whose side to be laminated is easily bondable/hologram layer/adhesive layer/releasable sheet. This structure is irradiated with ultraviolet rays from a high-pressure mercury lamp for the fixation of the volume hologram layer, thereby preparing the label for the fabrication of the second multilayer volume hologram. The fixing treatment using a high-pressure mercury lamp may be carried out subsequent to the step where the hologram is recorded in the hologram-recording medium and then heat treated. The second multilayer volume hologram is fabricated by releasing the releasable sheet from the obtained label, and applying the exposed surface of the label on the application member.

The third multilayer volume hologram of the present invention is now explained. As shown in FIG. 5(*a*), a surface protective coating film 8 is used in place of the surface protective film in the first multilayer volume hologram. A releasable substrate 11 is laminated on the surface protective coating film. Otherwise, the third multilayer volume hologram is the same as the first multilayer volume hologram.

When the third multilayer volume hologram is not in use, the substrate 11 has a function of protecting the surface of the volume hologram layer, viz., resistance to scratching, light resistance, weather resistance, etc. When the third volume hologram is used, the substrate 11 is released off. The surface protective coating film, on which the substrate 11 is laminated, may be subjected on the surface to a releasing treatment, etc. However, the substrate 11 should be bonded to the surface protective coating film with a certain adhesion force because it serves to support the volume hologram layer 6 together with the release sheet. It is here noted that when the volume hologram layer is used, the substrate 11 must be released off. It is thus preferable to control the adhesive properties and releasability of the substrate making use of the releasability of the surface protective coating film 8.

For the substrate 11, for instance, use may be made of polyethylene films, polypropylene films, polyethylene fluoride films, polyvinylidene fluoride films, polyvinyl chloride films, polyvinylidene chloride films, ethylene-vinyl alcohol films, polyvinyl alcohol films, polymethyl methacrylate films, polyether sulfone films, polyether ether ketone films, polyamide films, tetrafluoroethylene-perfluoroalkylvinyl ether copolymer films, polyester films such as polyethylene terephthalate films, and polyimide films which have a thickness of 2 $\mu$m to 200 $\mu$m, preferably 10 $\mu$m to 50 $\mu$m. The substrate may also be formed of a transparent film or an opaque film kneaded with a shielding pigment such as carbon black, so that the hologram layer can be protected before the multilayer volume hologram is used, and the substrate can be released off without forgetting.

This surface protective coating film 8 must have adhesion to the volume hologram layer 6 and releasability from the substrate 11. After the substrate 11 is released off, the surface protective coating film is required to have functions such as hard coatability, printability and slip capability because it must serve as a protective layer for the volume hologram layer. In view of protection of the volume hologram layer after the substrate 11 is released off, it is preferable to form this surface protective coating film using as a main binder methacrylate resins such as polymethyl methacrylate. To improve each of such functions, at least one component selected from polyacrylic acid ester resins, polyvinyl chloride resins, cellulose resins, silicone resins, chlorinated rubber, casein or the like is added to the main resin. The binder and additives are dissolved in an organic solvent to form an ink. Then, this ink is coated or otherwise formed on the substrate 11, preferably with a thickness of 0.1 $\mu$m to 3 $\mu$m in consideration of surface protective properties.

The surface protective coating film 8 should preferably be formed of a material selected in such a way that the peel force between it and the substrate 11 is in the range of 0.001 to 0.1 kgf/25 mm (90° peeling), and preferably 0.001 to 0.005 kgf/25 mm. The peel force between the substrate 11 and the surface protective coating film 8 should be smaller than the peel force between the surface protective coating film and the volume hologram and the peel force between the volume hologram layer and the application member. It is here noted that the breaking strength of the substrate should be at least 10 kgf/mm$^2$, and preferably at least 15 kgf/mm$^2$ in both the MD (film's lengthwise direction) and TD (film's widthwise direction) directions.

The third multilayer volume hologram is characterized in that the breaking strength ($\xi$) of the multilayer structure comprising the volume hologram layer and the surface protective coating film is smaller than the peel strength ($\epsilon$) with which the multilayer structure comprising the volume hologram layer and the surface protective coating film is peeled off the application member. In short, the aforesaid breaking and peel strengths should have such relations as given by $\xi<<\epsilon$.

The breaking strength ($\xi$) of the multilayer structure comprising the volume hologram layer and the surface protective coating film is in the range of 0.005 kgf/mm$^2$ to 0.05 kgf/mm$^2$, and the peel strength ($\epsilon$) with which the multilayer structure comprising the volume hologram layer and the surface protective coating film is peeled off the application member is of the order of 0.5 kgf/25 mm to 3 kgf/25 mm.

For use, the substrate 11 is released off the third multilayer volume hologram. However, upon a forced peeling of the hologram seal from the application member, as shown in FIG. 5($b$), the volume hologram layer 6 breaks down due to a cohesive failure and so cannot possibly be reused.

As shown in FIG. 6($a$), a pattern or patterns 10 should preferably be provided between the adhesive layer 5 and the volume hologram layer 6 and/or between the volume hologram layer 6 and the surface protective coating film 8 (not shown), because counterfeit-proofness can be improved.

For the pattern(s) 10, the layer capable of decreasing or increasing adhesion strength may be used as in the case of the aforesaid second multilayer volume hologram.

In the case where between the second adhesive layer 9 and the hologram layer 6 there is patterned the layer capable of diminishing the adhesion strength between both layers, the portion of the hologram layer 6 contiguous to the pattern 10 does not broke down even upon a forced peeling of the volume hologram layer, as shown in FIG. 6($b$). However, other portion of the hologram layer 6 between the adhesive layer 5 and the surface protective coating film 8 breaks down due to a cohesive failure. Thus, the hologram layer 6 breaks down according to the pattern 10, and so cannot possibly be reused.

How to fabricate the third multilayer hologram is now explained.

A first multilayer structure (1), a second multilayer structure (2) and a third multilayer structure (3) are separately furnished. The first multilayer structure (1) comprises a releasable sheet/hologram-forming material layer/releasable sheet, the second multilayer structure (2) comprises a releasable sheet/adhesive layer/releasable sheet, and the third multilayer structure (3) comprises a substrate/surface protective coating film.

First, a hologram is recorded in the hologram-recording medium in the first multilayer structure, followed by a heat treatment. Then, the releasable sheet is released from the first multilayer structure. The third multilayer structure is laminated on the surface protective coating film surface at about 80° C. over the exposed hologram layer surface to make a mutilayer structure comprising a substrate/surface protective coating film/hologram layer/releasable sheet. After the releasable sheet is released from the obtained multilayer structure, the second multilayer structure, from which the releasable sheet is removed, is lamnated at room temperature on the multilayer structure, and treated with a high-pressure mercury lamp for fixation, thereby preparing a label for the fabrication of the third multilayer volume hologram of the present invention comprising a substrate/surface protective coating film/volume hologram layer/adhesive layer/releasable sheet. The fixing treatment using a high-pressure mercury lamp may be carried out subsequent to the step where the hologram is recorded in the hologram-recording medium and then heat treated. The third multilayer volume hologram is fabricated by releasing the releasable sheet from the obtained label, and applying the exposed surface of the label on the application member.

The label for the fabrication of each multilayer volume hologram of the present invention may have been cut in conformity to the shape of an application article or part. When the label for the fabrication of each multilayer volume hologram of the invention includes the releasable sheet, it is preferable to provide cutouts in portions of the label other than the releasable sheet. This is because individual labels of given shape can be taken out of labels of large size or in a rolled-up form for application to articles. Such processing may be carried out by making a notch. To make a notch only in the portions of the label other than the releasable sheet, it is preferable to vertically move a blade at a stroke corresponding to the thickness of the label other than the releasable sheet. It is also allowed to remove respective layers other than the releasable sheet between adjacent labels, leaving individual labels of given shape. In this case, the releasable sheet may be provided at its boundaries with perforations along which individual labels are detachable.

The present invention is now explained more specifically with reference to examples.

EXAMPLE 1

Preparation of the First Multilayer Volume Hologram and the Label for the Fabrication of the Multilayer Volume Hologram

First Multilayer Structure Comprising a Surface Protective Film/Hologram-forming Material Layer/Releasable Sheet A coating solution comprising the hologram-forming components was gravure coated on a polyethylene terephthalate film (Lumirror T-60 made by Toray Industries, Inc. with a thickness of 50 μm and a breaking strength of 22.0 kgf/mm$^2$ (MD) and 22.0 kgf/mm$^2$ (TD)) to a post-drying thickness of 10 μm. The hologram-forming materials were:

| | |
|---|---|
| Volume hologram-forming photosensitive resin composition comprising a polymethyl methacrylate resin (Tg: 100° C.) as a basic binder | 60 parts by weight |
| Methyl ethyl ketone | 25 parts by weight |
| Toluene | 15 parts by weight |

A PET film with the surface subjected to a release treatment (SP-PET made by Tohcello Paper Co., Ltd. with a thickness of 50 μm) was laminated onto the thus coated surface to prepare the first multilayer structure.

Second Multilayer Structure Comprising a Releasable Sheet/Adhesive Layer/Releasable Sheet The following composition was used as the adhesive agent.

TABLE 1

| | |
|---|---|
| Acrylic adhesive (Nissetsu PE-118, Nippon Carbide Industries, Inc.) | 100 parts by weight |
| Methyl Ethyl Ketone | 30 parts by weight |
| Toluene | 15 parts by weight |
| Ethyl acetate | 15 parts by weight |
| Isocyanate crosslinking agent (Nissetsu CK-101, Nippon Carbide Industries, Inc.) | 2 parts by weight |

The adhesive agent of the aforesaid composition was coated on the PET film with the surface subjected to a release treatment (SP-PET made by Tohcello Co., Ltd. with a thickness of 50 μm) to a post-drying thickness of 10 μm by means of a comma coater. Then, a PET film with the surface subjected to a release treatment (SP-PET made by Tohcello Co., Ltd. with a thickness of 50 μm) was laminated on the thus coated surface to obtain the second multilayer structure.

Hologram Recording

A Lippmann hologram was recorded in the hologram layer in the first multilayer structure using laser light of 514 nm wavelength, followed by a 10-minute heating at 100° C.

Lamination of the Adhesive Layer

The releasable sheet was released from the first multilayer structure with the hologram recorded therein. Then, the second multilayer structure, from which the releasable sheet was removed, was laminated at room temperature on the hologram layer surface. Thereafter, the laminate was irradiated with ultraviolet radiation of 3,000 mJ/cm$^2$ from a high-pressure mercury lamp for fixation, thereby obtaining a label for the fabrication of the first multilayer volume hologram of the present invention comprising a surface protective film/volume hologram layer/adhesive layer/releasable sheet.

Formation of the Hologram Seal

The hologram label, from which the release sheet was removed, was laminated at room temperature on a portrait-attached ID card of credit card size as an application member, thereby sealing the portrait, and then let standing at room temperature for 24 hours, thereby preparing a hologram seal. An attempt to peel the hologram seal off the portrait caused the surface protective film to be peeled off, and an attempt to peel off the volume hologram layer caused a cohesive failure in the volume hologram layer, so that the volume hologram layer could not be released off the ID card and the hologram could not be reconstructed.

Measurement of the Breaking Strength of the Volume Hologram Layer

The first multilayer structure with the hologram recorded therein and subjected to the heat treatment was irradiated with ultraviolet radiation of 3,000 mJ/cm$^2$ from a high-pressure mercury lamp for fixation of the hologram. The obtained hologram layer was found to have a breaking strength of 2.86 kgf/mm$^2$ as measured according to JIS K7127-1989, with a breaking elongation of 4.9%. The glass transition temperature was 97° C.

Measurement of the Peel Strength Between the Surface Protective Film and the Volume Hologram Layer By measurement, the peel strength between the surface protective film and the volume hologram layer was found to be 0.012 kgf/25 mm.

Measurement of the Peel Strength Between the Volume Hologram Layer and the Application Member (1) The aforesaid first multilayer structure was used to prepare a PET film/hologram-forming material layer/releasable sheet laminate, which was recorded and heat treated as mentioned above.

(2) Apart from this, an adhesive agent (Nissetsu PE-118, Nippon Carbide Industries, Inc.) was coated on the surface of a releasable PET film (HP-7 made by Teijin Limited with a thickness of 50 μm) to a post-drying thickness of 10 μm.

(3) The multilayer structure (2) was laminated on the adhesive layer surface over the surface of the multilayer hologram from which the releasable sheet was removed. Then, the resultant laminate was exposed to UV, thereby preparing a label comprising a PET film/hologram-forming material layer/adhesive layer/releasable PET film. Finally, the label was pasted on an application member as mentioned above, thereby forming a hologram seal.

By measurement, the peel strength between the volume hologram layer and the application member in the obtained hologram sheet was found to be 3.2 kgf/25 mm.

EXAMPLE 2

Preparation of the Second Multilayer Volume Hologram and the Label for the Fabrication of the Multilayer Volume Hologram

First Multilayer Structure Comprising a Surface Protective Film whose side to be Laminated was Treated with Corona/Hologram-recording Material Layer/Releasable Sheet A polyethylene terephthalate film (Lumirror T-60 made by Toray Industries, Inc. with a thickness of 50 μm and a breaking strength of 22.0 kgf/mm² (MD) and 22.0 kgf/mm² (TD)) was treated on the surface with corona to enhance its adhesion for the hologram-recording material. A coating solution comprising the following components was coated on the adhesion-enhanced surface to a post-drying thickness of 10 μm. The hologram-forming components were:

| | |
|---|---|
| Volume hologram-forming photosensitive resin composition comprising a polymethyl methacrylate resin (Tg: 100° C.) as a basic binder | 60 parts by weight |
| Methyl ethyl ketone | 25 parts by weight |
| Toluene | 15 parts by weight |

A PET film with the surface subjected to a release treatment (SP-PET made by Tohcello Co., Ltd. with a thickness of 50 μm) was laminated onto the thus coated surface to prepare the first multilayer structure.

The label for the fabrication of the second multilayer volume hologram and the second multilayer volume hologram were prepared as in Example 1 with the exception that the aforesaid first multilayer structure was used in place of the first multilayer structure in Example 1.

An attempt to peel the hologram seal in the obtained multilayer volume hologram from the application member caused the volume hologram layer to break down due to a cohesive failure. Consequently, the hologram layer could not be peeled off the application member, so that the hologram could not be reconstructed.

Measurement Between the Surface Protective Film whose side to be Laminated was Treated with Corona and the Volume Hologram Layer The aforesaid first multilayer structure was subjected to the same hologram recording and heat treatment as mentioned above.

On the other hand, an adhesive agent (Nissetsu PE-118, Nippon Carbide Industries, Ltd.) was coated on the surface of a polyethylene terephthalate film (HP-7 made by Teijin Limited with a thickness of 50 μm) to a post-drying thickness of 10 μm. Then, the first multilayer structure was laminated at room temperature on the releasable sheet side over the thus coated surface, thereby preparing a label comprising a surface protective film whose side to be laminated was treated with corona/volume hologram layer/adhesive layer/PET film (HP-7 made by Teijin Limited with a thickness of 50 μm). Finally, the hologram was fixed by UV treatment and let standing for 24 hours.

By measurement, the peel strength between the surface protective film whose side to be laminated was treated with corona and the volume hologram layer was found to be 2.4 kgf/25 mm.

EXAMPLE 3

Preparation of the Second Multilayer Volume Hologram Provided with a Pattern Layer and the Label for the Fabrication of the Multilayer Volume Hologram

First Multilayer Structure Comprising a Releasable Sheet/Hologram-forming Material Layer/Releasable Sheet The first multilayer structure obtained in Example 1 was kept on hand.

Second Multilayer Structure Comprising a Releasable Sheet/First Adhesive Layer/Releasable Sheet The following composition was used as the first adhesive agent.

TABLE 2

| | |
|---|---|
| Acrylic adhesive (Nissetsu PE-118, Nippon Carbide Industries, Inc.) | 100 parts by weight |
| Methyl Ethyl Ketone | 30 parts by weight |
| Toluene | 15 parts by weight |
| Ethyl acetate | 15 parts by weight |
| Isocyanate crosslinking agent (Nissetsu CK-101, Nippon Carbide Industries, Inc. | 16 parts by weight |

The adhesive agent of the aforesaid composition was coated on a PET film with the surface subjected to a release treatment (SP-PET made by Tohcello Co., Ltd. with a thickness of 50 μm) to a post-drying thickness of 10 μm by means of a comma coater. Then, a PET film with the surface subjected to a release treatment (SP-PET made by Tohcello Co., Ltd. with a thickness of 50 μm) was laminated on the thus coated surface to obtain the second multilayer structure.

Third Multilayer Structure Comprising a Surface Protective Film/Second Adhesive Layer/Pattern Layer Capable of Decreasing Adhesion Strength/Releasable Sheet A polyethylene terephthalate film (Lumirror T-60 made by Toray Industries, Inc. with a thickness of 50 μm and a breaking strength of 22.0 kgf/mm² (MD) and 22.0 kgf/mm² (TD)) was provided as the surface protective film 7. Then, the second adhesive agent of the following composition was coated on the PET film to a post-drying thickness of 10 μm, using a comma coater.

TABLE 3

| | |
|---|---|
| Acrylic adhesive (Nissetsu PE-118, Nippon Carbide Industries, Inc.) | 100 parts by weight |
| Methyl Ethyl Ketone | 30 parts by weight |
| Toluene | 15 parts by weight |
| Ethyl acetate | 15 parts by weight |
| Isocyanate crosslinking agent (Nissetsu CK-101, Nippon Carbide Industries, Inc.) | 2 parts by weight |

Using a coating solution comprising the following components, given characters were printed on another PET film with the surface subjected to a release treatment (SP-PET made by Tohcello Co., Ltd. with a thickness of 50 μm)

at a post-drying thickness of 0.5 μm by means of gravure printing. The components herein used were:

| | |
|---|---|
| Acrylic adhesive (Nissetsu PE-118, Nippon Carbide Industries, Inc.) | 100 parts by weight |
| Methyl Ethyl Ketone | 30 parts by weight |
| Toluene | 15 parts by weight |
| Ethyl acetate | 15 parts by weight |
| Isocyanate crosslinking agent (Nissetsu CK-101, Nippon Carbide Industries, Inc.) | 2 parts by weight |
| Silicone (ST94PA made by Toray Industries, Inc.) | 8 parts by weight |

The obtained two multilayer structures were laminated together on their adhesive layer sides to prepare a third multilayer structure.

Hologram Recording

A Lippmann hologram was recorded in the hologram layer in the first multilayer structure using laser light of 514 nm wavelength, followed by a 10-minute heating at 100° C.

Lamination of the First Adhesive Layer

The releasable sheet was removed from the first multilayer structure with the hologram recorded in it, and the second multilayer structure, from which the releasable sheet was removed, was laminated on the hologram layer surface to obtain a multilayer structure comprising a releasable sheet/hologram layer/first adhesive layer/releasable sheet.

The releasable sheet contiguous to the hologram layer was removed from the structure, and the third multilayer structure, from which the releasable sheet was removed, was laminated at room temperature on the exposed hologram layer to obtain a multilayer structure comprising a surface protective film/second adhesive layer/pattern layer capable of decreasing adhesion strength/hologram layer/first adhesive layer/releasable sheet.

The obtained structure was irradiated with 3,000 mJ/cm$^2$ from a high-pressure mercury lamp for the fixation of the hologram, thereby obtaining a label for the fabrication of the second multilayer volume hologram according to the present invention.

Formation of the Hologram Seal

The hologram label, from which the release sheet was removed, was laminated at room temperature on a portrait-attached ID card of credit card size as an application member, thereby sealing the portrait, and then let standing at room temperature for 24 hours, thereby preparing a hologram seal. Even after let standing, there was no outside appearance change of the obtained hologram seal, and the pattern capable of decreasing adhesion strength could not be detected at all.

An attempt to peel the hologram seal off the portrait caused the surface protective film to be peeled off, and the hologram layer to be separated from the portion of the hologram seal on which the layer capable of decreasing adhesion strength was provided. Consequently, other hologram layer remained according to the design depending on the pattern. A cohesive failure occurred in the hologram layer at the site free from the layer capable of decreasing adhesion strength, and there were breaks on both sides of the application member and the surface protective film.

EXAMPLE 4

Preparation of the Third Multilayer Volume Hologram and the Label for the Fabrication of the Multilayer Volume Hologram The first multilayer structure comprising a releasable sheet/hologram-forming material layer/releasable sheet was provided as in Example 1.

The second multilayer structure comprising a releasable sheet/adhesive layer/releasable sheet was provided as in Example 1.

Third Multilayer Structure Comprising a Substrate/ Surface Protective Coating Film A polyethylene terephthalate film (Lumirror T-60 made by Toray Industries, Inc. with a thickness of 50 μm and a breaking strength of 22.0 kgf/mm$^2$ (MD) and 22.0 kgf/mm$^2$ (TD)) was provided as the substrate. Then, Hakuri Nisu UVC-5 (Showa Ink Industries, Co., Ltd.) was coated on the PET film to a post-drying thickness of 1 μm by means of a gravure coater to form a surface protective coating film, thereby preparing a third multilayer structure.

A Lippmann hologram was recorded in the hologram-forming material layer in the first multilayer structure as in Example 1. Then, the third multilayer structure was laminated at 80° C. on the surface protective coating film side over the hologram layer surface of the first multilayer structure from which the releasable sheet was removed, thereby obtaining a multilayer structure comprising a substrate/surface protective coating film/volume hologram layer/releasable sheet.

The second multilayer structure, from which the releasable sheet was removed, was laminated at room temperature on the surface of the obtained multilayer structure from which the releasable sheet was removed. Then, the laminate was irradiated with 3,000 mJ/cm$^2$ from a high-pressure mercury lamp for the fixation of the hologram, thereby obtaining a label for the fabrication of the third multilayer volume hologram of the present invention comprising a substrate/surface protective coating film/volume hologram/adhesive layer/releasable sheet.

Formation of the Hologram Seal

The hologram label, from which the release sheet was removed, was laminated at room temperature on a portrait-attached ID card of credit card size as an application member, thereby sealing the portrait, and then let standing at room temperature for 24 hours, thereby preparing a hologram seal. After the substrate was removed from the hologram seal, the hologram seal was forcibly peeled off the portrait. As a result, the volume hologram could not be peeled off due to a cohesive failure occurring in the volume hologram layer, so that the hologram could not be reconstructed.

Measurement of the Peel Strength Between the Substrate and the Surface Protective Coating Film By measurement, the peel strength between the substrate and the surface protective coating film was found to be 0.021 kgf/25 mm.

Measurement of the Breaking Strength of the Multilayer Structure Comprising a Surface Protective Coating Film/Volume Hologram Layer The multilayer structure comprising a substrate/surface protective coating film/volume hologram layer/releasable sheet was used to measure the breaking strength of the multilayer structure comprising a surface protective coating film/volume hologram layer. The breaking strength was 2.9 kgf/mm².

A multilayer volume hologram was prepared as mentioned above with the exception that a polyethylene terephthalate film (X30 made by Toray Industries, Inc.) kneaded with carbon black was used in place of the substrate in the third multilayer structure comprising a substrate/surface protective coating film. By making the substrate opaque, it was possible to conceal the design of the hologram and the portrait.

EXAMPLE 5

Preparation of the Third Multilayer Volume Hologram Provided with a Pattern Layer 10 and the Label for the Fabrication of the Multilayer Volume Hologram First Multilayer Structure Comprising a Releasable Sheet/Hologram-recording Material Layer/Releasable Sheet A hologram-recording material comprising 500 parts by weight of a polymethyl methacrylate resin (with a molecular weight of 200,000), 5 parts by weight of 3,9-diethyl-3'-carboxymethyl-2,2'-thiacarbocyanin iodine salt, 60 parts by weight of diphenyliodonium hexafluoroantimonate, 800 parts by weight of 2,2-bis[4-(acryloxydiethoxy)phenyl] propane and 800 parts by weight of pentaerythritol polyglycidyl ether was coated on a releasable PET film (made by Toray Industries, Inc. with a thickness of 50 μm) to a post-drying thickness of 10 μm, and a PET film (made by Tohcello Co., Ltd. with a thickness of 50 μm) was laminated onto the coated surface, thereby preparing a first multilayer structure comprising a releasable sheet/hologram-recording material layer/releasable sheet.

Hologram Recording

A Lippmann hologram was recorded in the hologram layer in the first multilayer structure using laser light of 514 nm wavelength, and then heat treated at 100° C. for 10 minutes. The hologram was fixed by irradiation with ultraviolet radiation of 3,000 mJ/cm² from a high-pressure mercury lamp.

Measurement of the Breaking Strength of the Volume Hologram Layer

The breaking strength of the obtained volume hologram layer was found to be 2.18 kgf/mm² as measured according to JIS K7127-1989. The breaking elongation was 24%.

The multilayer structure obtained in Example 4 and comprising a substrate/surface protective coating film was laminated at 80° C. on the surface protective coating film side over the surface of the hologram layer from which the releasable sheet was removed, thereby obtaining a second multilayer structure comprising a substrate/surface protective coating film/volume hologram layer/releasable sheet.

Third Multilayer Structure Comprising a Releasable Sheet/Pattern Layer/Adhesive Layer/Colored Layer/Adhesive Layer/Releasable Sheet A coating solution comprising the following components was used to print given characters on a releasable sheet to a post-drying thickness of 0.5 μm by means of gravure printing, thereby forming a pattern layer. The components herein used were:

| | |
|---|---|
| (Nissetsu PE-118, Nippon Carbide Industries, Inc.) | 100 parts by weight |
| Methyl Ethyl Ketone | 30 parts by weight |
| Toluene | 15 parts by weight |
| Ethyl acetate | 15 parts by weight |
| Isocyanate crosslinking agent (Nissetsu CK-101, Nippon Carbide Industries, Inc.) | 2 parts by weight |
| Silicone (ST94PA made by Toray Industries, Inc.) | 8 parts by weight |

Then, the multilayer structure obtained in Example 1 comprising a releasable sheet/adhesive layer/releasable sheet, from which the releasable sheet was removed, was laminated on the surface of the pattern layer, thereby preparing a multilayer structure A comprising a releasable sheet/pattern layer/adhesive layer/releasable sheet.

Just thereafter, a coloring agent solution comprising the following components was coated on the surface of the surface of the multilayer structure obtained in Example 1 and comprising a releasable sheet/adhesive layer/releasable sheet, from which the releasable sheet was removed, by means of a comma coater. The coating thickness was 10 μm as measured after drying. The components herein used were:

| | |
|---|---|
| (Nissetsu PE-118, Nippon Carbide Industries, Inc.) | 100 parts by weight |
| Methyl Ethyl Ketone | 40 parts by weight |
| Ethyl acetate | 15 parts by weight |
| Isocyanate crosslinking agent (Nissetsu CK-101, Nippon Carbide Industries, Inc.) | 2 parts by weight |
| Black dye (Kayaset black K-R made by Nippon Kayaku Co., Ltd.) | 20 parts by weight |

A silicone separate B (SP-PET made by Tohcello Co., Ltd. with a thickness of 50 μm) was laminated on the thus coated surface, thereby preparing a multilayer structure comprising a releasable sheet/colored layer/adhesive layer/releasable sheet.

After stripped of the releasable sheets, the multilayer structures A and B were laminated together, thereby obtaining a third multilayer structure comprising a releasable sheet/pattern layer/adhesive layer/colored layer/adhesive layer/releasable sheet.

Preparation of the Label for the Fabrication of the Third Multilayer Volume Hologram The thus obtained second and third multilayer structures were stripped of the respective releasable sheets. Thereafter, the second and third multilayer structures were laminated together, thereby preparing a label comprising a substrate/surface protective coating film/volume hologram layer/pattern layer/adhesive layer/colored layer/adhesive layer/releasable sheet.

Formation of the Hologram Seal

The hologram label, from which the release sheet was removed, was laminated at room temperature on a portrait-attached ID card of credit card size as an application member, thereby sealing the portrait, and then let standing at room temperature for 24 hours, thereby preparing a hologram seal.

After the substrate was peeled off, the volume hologram of improved contrast could be observed due to the incorporation of the colored layer. An attempt to peel the hologram seal off the portrait caused the volume hologram layer to break down due to a cohesive failure in a patterned state.

Measurement of the Peel Strength Between the Substrate and the Surface Protective Coating Film By measurement, the peel strength between the substrate and the surface protective coating film was found to be 0.021 kgf/25 mm.

Measurement of the Breaking Strength of the Multilayer Structure Comprising a Surface Protective Coating Film/Volume Hologram Layer By measurement, the breaking strength of the aforesaid second multilayer structure comprising a substrate/surface protective coating film/volume hologram layer/releasable sheet was found to be 2.23 kgf/mm$^2$. The peel strength between the volume hologram layer and the application member was found to be 3.02 kgf/25 mm as measured according to Example 1.

What we claim is:

1. A multilayer volume hologram wherein an adhesive layer, a volume hologram layer and a surface protective film are laminated on an application member in this order, characterized in that:
    a breaking strength of said hologram layer is larger than (1) a peel strength between said surface protective film and said hologram layer, and smaller than (2-1) a peel strength upon a release of said hologram layer from said application member and (2-2) a breaking strength of said surface protective film,
    said surface protective film is releasable from said volume hologram layer, and
    said volume hologram layer is incapable of being released from said application member, and undergoes a cohesive failure upon a forced release.

2. A multilayer volume hologram wherein an adhesive layer, a volume hologram layer and a surface protective film easily bondable to said hologram layer are laminated on an application member in this order, characterized in that a breaking strength of said hologram layer is smaller than a peel strength between said surface protective film and said hologram layer, and the peel strength between said surface protective film and said hologram layer is smaller than a peel strength upon a release of said hologram layer from said application member and a breaking strength of said surface protective film.

3. The multilayer volume hologram according to claim 2, characterized in that said surface protective film is laminated on said hologram layer with an adhesive layer interposed therebetween.

4. The multilayer volume hologram according to claim 2, characterized in that said volume hologram layer is provided on one or both surfaces with a layer in a pattern form, said layer making an adhesion strength between said hologram layer and a layer on which said hologram layer is laminated locally different, said surface protective film and/or said adhesive layer are laminated on said hologram layer with said pattern interposed therebetween, and upon a release of said hologram layer together with said surface protective film, said hologram layer is broken to a hologram layer portion corresponding to said layer that makes said adhesion strength locally different and other hologram layer portion in a pattern form.

5. A multilayer volume hologram wherein an adhesive layer, a volume hologram layer, a surface protective coating film having adhesion with respect to said hologram layer and a substrate releasable from said surface protective coating film are laminated on an application member in this order, characterized in that a breaking strength of a multilayer structure comprising said hologram layer and said surface protective coating layer from which said substrate has been released is smaller than a peel strength upon a release of said multilayer structure comprising said hologram layer and said surface protective coating film from said application member.

6. The multilayer volume hologram according to claim 5, characterized in that said volume hologram layer is provided on one surface with a layer in a pattern form, said layer being provided to make an adhesion strength between said hologram layer and a layer on which said hologram layer is laminated locally different, said surface protective coating film and/or said adhesive layer and said hologram layer are laminated together with said pattern interposed therebetween, and upon a release of a multilayer film comprising said hologram layer and said surface protective coating film after a release of said substrate, said multilayer film is broken into a hologram layer portion corresponding to said layer that makes said adhesion strength locally different and other hologram layer portion in a pattern form.

7. The multilayer volume hologram according to claim 4 or 6, characterized in that said layer that makes said adhesion strength between both layers locally different comprises 1 part by weight to 20 parts by weight of a releasing agent per 100 parts by weight of an adhesive resin binder.

8. The multilayer volume hologram according to claim 1, 2 or 5, characterized in that said adhesive layer contains therein a colored layer selected from a colored adhesive layer, a printed layer, a light reflecting layer and a colored resin film.

9. A multilayer volume hologram fabrication label for fabricating a multilayer volume hologram as recited in claim 1, 2 or 5, characterized in that a release sheet instead of said application member is laminated on said adhesive layer.

* * * * *